United States Patent [19]

Tsutsui et al.

[11] Patent Number: 5,060,228
[45] Date of Patent: Oct. 22, 1991

[54] BRIDGE COMMUNICATION SYSTEM

[75] Inventors: Eiichi Tsutsui; Wataru Nakashima, both of Yokohama, Japan

[73] Assignee: Fujitsu Limited, Kawasaki, Japan

[21] Appl. No.: 438,081

[22] Filed: Nov. 20, 1989

[30] Foreign Application Priority Data

Nov. 19, 1988 [JP] Japan .................................. 63-293193
May 30, 1989 [JP] Japan .................................. 01-136695
Jul. 10, 1989 [JP] Japan .................................. 01-177802

[51] Int. Cl.$^5$ .............................................. H04J 3/02
[52] U.S. Cl. .................................... 370/85.13; 370/85.9
[58] Field of Search ................ 370/85.13, 85.14, 94.3, 370/94.1, 85.12, 85.9, 85.1, 94.2; 340/825.05, 825.5, 825.51

[56] References Cited

U.S. PATENT DOCUMENTS 4,707,829 11/1987 Bione et al. ...................... 370/85.13
4,737,953 4/1988 Koch et al. ...................... 370/85.13
4,933,937 6/1990 Konishi .......................... 370/85.13

Primary Examiner—Douglas W. Olms
Assistant Examiner—Wellington Chin
Attorney, Agent, or Firm—Staas & Halsey

[57] ABSTRACT

A bridge communication system connects a plurality of bridge apparatuses, each connected to a local area network, through a backbone network. The present system performs a node address setting in the bridge apparatuses to add an address of the source node of the backbone network to a data frame. A learning table is provided in the respective bridge apparatuses for storing at least the source address corresponding to the terminal address, the port numbers of each bridge apparatus, and the address of the node of the backbone network. The system searches the learning table using a destination address designating a destination terminal in the data frame transmitted to the respective bridge apparatuses adds an address of a backbone node, obtained by the searching, to the data frame to be transmitted to the backbone network.

13 Claims, 18 Drawing Sheets

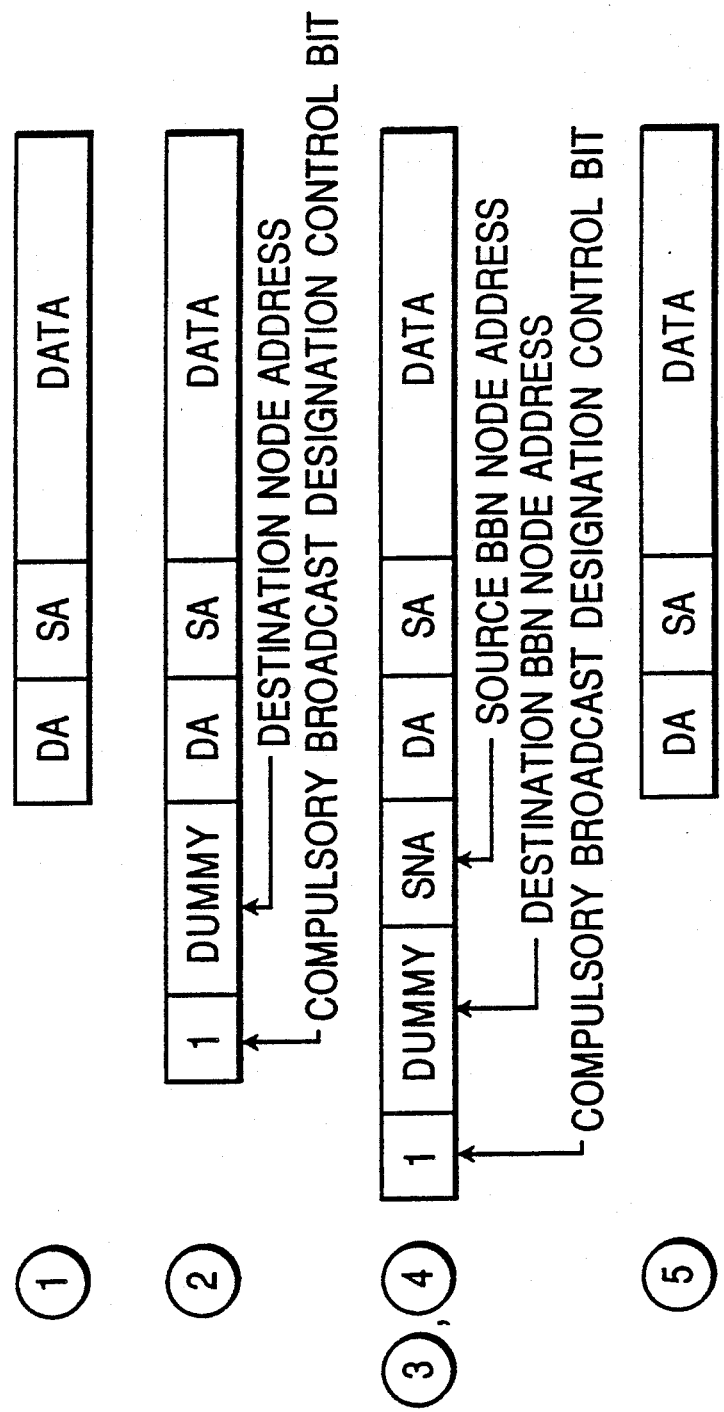

LEARNING TABLE (A)

| MAC-ADRS | | CHAIN EXISTENCE / NON-EXISTENCE | DATA VALID / INVALID | | TRANSMITTING PORT NUMBER | DESTINATION BBN NODE ADDRESS | TIMER VALUE |
|---|---|---|---|---|---|---|---|
| S1 | #1 | NEXT TABLE ADDRESS | 1 | 1 | RE-SERVED | m | — | 0 |
| S2 | | | | | | | | ← NO NEW ONE |
| S3 | | | | | | | | ← NO NEW ONE |
| S4 | #2 | NEXT TABLE ADDRESS | 1 | 1 | RE-SERVED | p | NB | 0 |

FIG. 9A

LEARNING TABLE (B)

| MAC-ADRS | | CHAIN EXISTENCE / NON-EXISTENCE | DATA VALID / INVALID | | TRANSMITTING PORT NUMBER | DESTINATION BBN NODE ADDRESS | TIMER VALUE |
|---|---|---|---|---|---|---|---|
| S1 | | | | | | | ← NO NEW ONE |
| S2 | #1 | NEXT TABLE ADDRESS | 1 | 1 | RE-SERVED | q | NA | 0 |
| S3 | #2 | NEXT TABLE ADDRESS | 1 | 1 | RE-SERVED | n | — | 0 |
| S4 | | | | | | | ← NO NEW ONE |

FIG. 9B

BRIDGE COMMUNICATION SYSTEM

The present invention relates to a bridge communication system and more particularly to a bridge communication system for performing a communication between terminals of a local area network connected to a plurality of bridge apparatuses, which are connected to each other via a backbone network.

Where a communication is conducted between a plurality of LANs (local area networks), a MAC (media access control) is used to connect them through a bridge apparatus. Where a network is broad and large-scale, respective bridge apparatuses are connected to a backbone network (BBN), thereby performing a bridge communication. The BBN comprises a plurality of nodes to each of which the bridge apparatus is connected, enabling interconnections to be made between the nodes.

FIG. 1 shows a block diagram of a communication system with a MAC bridge apparatus. Here, 1 is a MAC bridge apparatus, P1 to P3 are ports, LAN (1) 2a to LAN (3) 2c are local area networks, HC is a host computer, WS is a work station, T is a terminal, PR is a printer, PC is a personal computer, and M is a memory.

Bridge apparatus 1 connects LANs 2a to 2c, which may have the same or different kinds of MAC sublayers, via the MAC sublayer and performs a relay transmission of the data in the LLC (logical link control) layer in a transparent manner. In order to realize this function, the MAC bridge apparatus reads a destination MAC address (DA) by using a transmitted data frame and determines a LAN (transmitting port) for transmitting the data frame in accordance with the DA.

The above bridge communication can be conducted using the following method. First, a learning table for determining a MAC address corresponding to the source address (SA) and an output port corresponding to the MAC address is prepared in the bridge apparatus. Then, when the data frame is received by an input port of the bridge apparatus, the table is referred to by using the MAC address of the data frame. Next, the data frame is outputted from the corresponding output port, thereby performing a relay operation of the data frame.

The conventional learning table set in the bridge apparatus does not include the source (destination) node address of the BBN if the bridge is connected to a BBN.

The BBN, which is not shown in FIG. 1, may read a header of a MAC layer of the data frame in the LAN and then transfer it to a destination BBN node. In this bridge communication system, the destination address DA, a source address SA and data DATA are formed by the bridge apparatus and transmitted to the node of the BBN to which the bridge apparatus is connected. The BBN determines the source node address (SNA) of the BBN and transmits the data frame to the other node of the BBN. However, this method requires that the learning function be realized in the BBN, thereby increasing the BBN load. Respective nodes of the conventional BBN do not have a function of setting the source node address in the data frame received from the bridge apparatus. Thus, it is necessary to add the above function to respective nodes of the conventional BBN. As a result, it cannot utilize the BBN without modifying the function of the BBN. As the BBN is also used for other communications than a LAN communication, it is difficult to change the BBN merely to facilitate the LAN communication.

In the above prior-art apparatus, the entire element is deleted from the MAC address table when the communication is temporarily interrupted, resulting in a loss of all the data and elements which had been registered. If the power source of the MAC bridge apparatus is shut off, the content of the MAC address table obtained through the registering process is extinguished.

SUMMARY OF THE INVENTION

An object of the present invention is to provide a large scale bridge network without increasing the load of a BBN network. This is achieved by providing a learning table in the bridge apparatus, giving the bridge apparatus a learning function of the destination node address of the BBN.

Another object of the present invention is to provide a bridge communication system to utilize respective nodes of the conventional backbone network without adding a function to them.

A further object of the present invention is to provide a MAC bridge apparatus for preventing the content of the MAC address learning table obtained from a learning process from being extinguished in an undesired manner.

A feature of the present invention resides in a bridge communication system for connecting a plurality of bridge apparatuses (each connected to a local area network) through a backbone network and for performing a communication between terminals connected to the local area network through the backbone network. This system comprises a node address setting means provided in said bridge apparatuses for previously setting the address of the node of said backbone network to which said bridge apparatuses are connected; a learning table provided in said bridge apparatuses for storing at least a port number of each bridge apparatus and the address of the backbone network node to correspond to said terminals; means for sequentially registering in said learning table a source address designating a transmission source terminal of a data frame received by said bridge apparatuses from said local area network and said backbone network, the number of the port through which the data frame is received by said bridge apparatus, a source node address in a data frame transmitted from said backbone network as a terminal address, a port number and a node address, means for searching said learning table using an address designating a destination terminal in the data frame transmitted from said respective bridge apparatuses as a terminal address, means for adding at least an address of a node of said node address setting means and an address of a node obtained by said searching to said data frame to be transmitted to said backbone network as the transmission source node address and the transmission destination node address, respectively, means for transmitting said data frame through a port designating the port number obtained when the search is completed, and means for broadcasting the data frame from all ports other than that through which the data frame is received when said search is not successful.

Upon a registration of a table element in the learning table, the MAC address representing SA is registered in the table. Upon a search of the learning table, the MAC address is then compared with the DA of an entering data frame and, if the search is successful, the port number of the bridge apparatus and the destination BBN node address of the BBN are extracted from the learning table, thereby performing the relay transmission of the data frame.

BRIEF DESCRIPTION OF THE DRAWINGS

FIG. 8A is a frame format of the data frame to which the DA not registered in a learning table in a bridge apparatus is transferred, FIGS. 9A and 9B are table formats of examples of the learning table.

DESCRIPTION OF THE PREFERRED EMBODIMENT

Embodiments of the present invention will be explained hereinafter by referring to the attached drawings.

Figure 1:
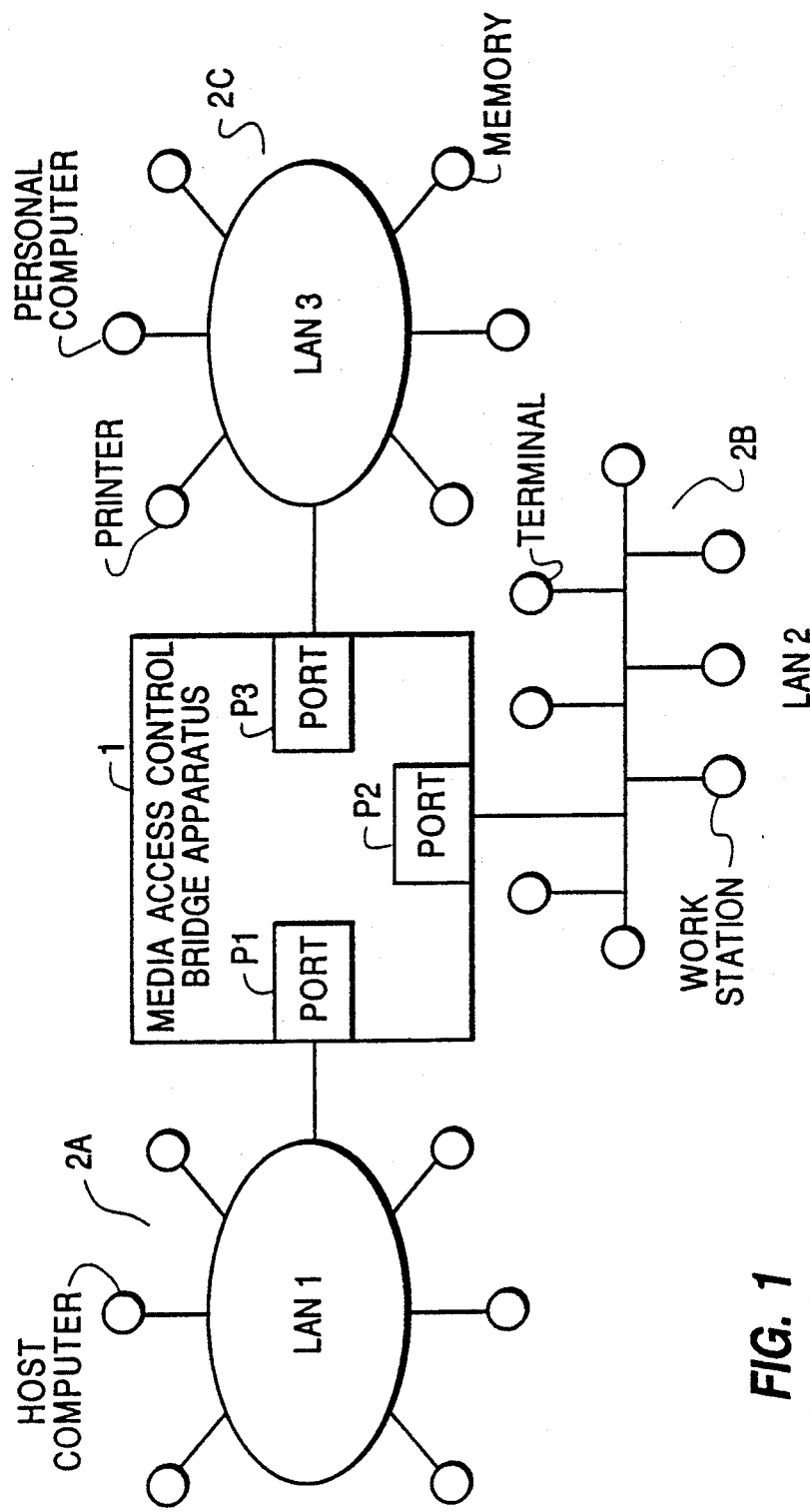
FIG. 1 is a block diagram of a conventional communication system using a bridge apparatus.
Figure 2:
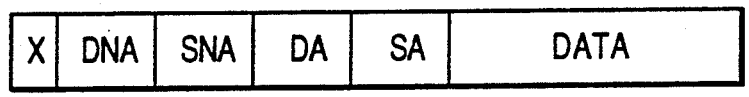
FIG. 2 is a frame format of a data frame used for a data communication system using a backbone network.

As shown in FIG. 2, the BBN data frame used for communication within the BBN comprises a compulsory broadcasting control bit X, a destination node address DNA, a source node address SNA, a LAN destination address DA, a LAN source address SA and data DATA. The LAN data frame used for communication within the LAN comprises a format formed by deleting compulsory broadcasting control bit X, destination node address DNA, and source node address SNA from the BBN data frame shown in FIG. 2.

The transmission source address (SA) and the receiving port (RP) are written in the MAC address table in a manner corresponding to each other. However, if new addresses are continually registered in the MAC table and even seldom-used addresses are retained, the table becomes large, resulting in an increasing amount of time to perform a search. To avoid such situation, a non-communication timer is provided by which an unused address is deleted a predetermined time after registration.

Figure 3:
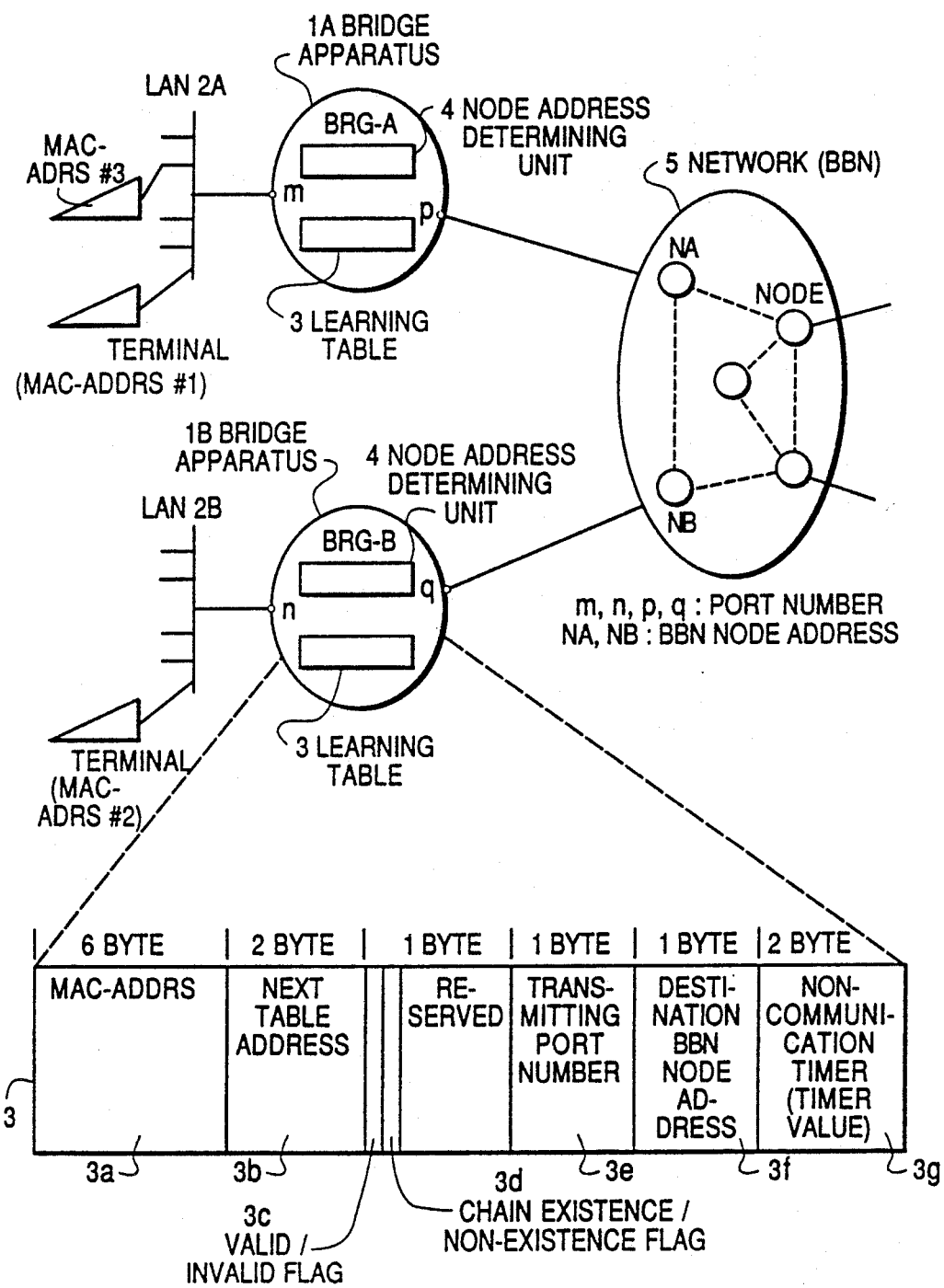
FIG. 3 is a schematic diagram illustrating an embodiment of the present invention.

Bridge apparatuses (BRG-A and BRG-B) 1A and 1B in FIG. 3, are relays for performing a relay transmission of a frame and include learning table 3 and node address determining means 4.

Learning table 3 stores MAC address (MAC-ADRS) 3a of 6 bytes, namely, the SA extracted from the data frame; a next table address 3b of 2 bytes, for performing a chain operation by pointing to the next table; a valid-/invalid flag 3c representing the validity of data; a chain flag 3d representing the existence of a chain; a port number 3e of 1 byte at which data from the SA is received (transmission port number); a destination BBN node address 3f of 1 byte directed from backbone network 5 to DA; and a non communication timer 3g (value) of 2 bytes.

Node address determining unit 4 sets, in advance, an address of a node of backbone network 5 to which bridge apparatuses 1A and 1B are connected.

As shown in FIG. 3, respective bridge apparatuses 1A and 1B have learning table 3 and learn the SA and a received port number (transmission port number) of the data frame by registering (re-registering) the SA and the port number in learning table 3 when bridge apparatus 1A is requested to perform a relay transmission of the data frame. When the destination address (DA) of the data frame is registered, the bridge apparatuses transmit the data frame to the port number and further to the destination BBN node address. When the DA is not registered, they perform a broadcast.

Therefore, by letting respective bridges 1A and 1B perform a learning function using table 3, a large scale bridge network can be easily constructed without requiring that the backbone network perform a learning function.

The structure and operation of the first embodiment of the present invention will be explained by referring to FIGS. 3 to 6. In FIG. 3, bridge apparatus (BRG-A) 1A performs a relay transmission of the data frame from port numbers m and p to LAN 2A and to node NA of backbone network 5.

Network 5 is a backbone network (BBN), in which a plurality of bridge apparatuses 1A and 1B are connected to respective nodes to perform a connection between them.

LAN 2A, and LAN 2B are local area networks connected to the terminals of MAC-ADRS#1 to #3 as shown.

The terminal address (MAC-ADRS), the port number (of BRG) and the node address (of BBN) obtained from the entering data frame are registered in learning table 3 of respective bridge apparatuses 1A and 1B. The port number through which the data frame is transmitted can be obtained through a search of learning table 3. Node address determining means 4 is provided in respective bridge apparatuses 1A and 1B to add the source node address of a BBN to the data frame transmitted to backbone network 5 from bridge apparatuses 1A and 1B. Thus, nodes NA and NB need not add these transmission source node addresses, and thus a conventional backbone network 5 can be utilized without any modification.

Figure 4:
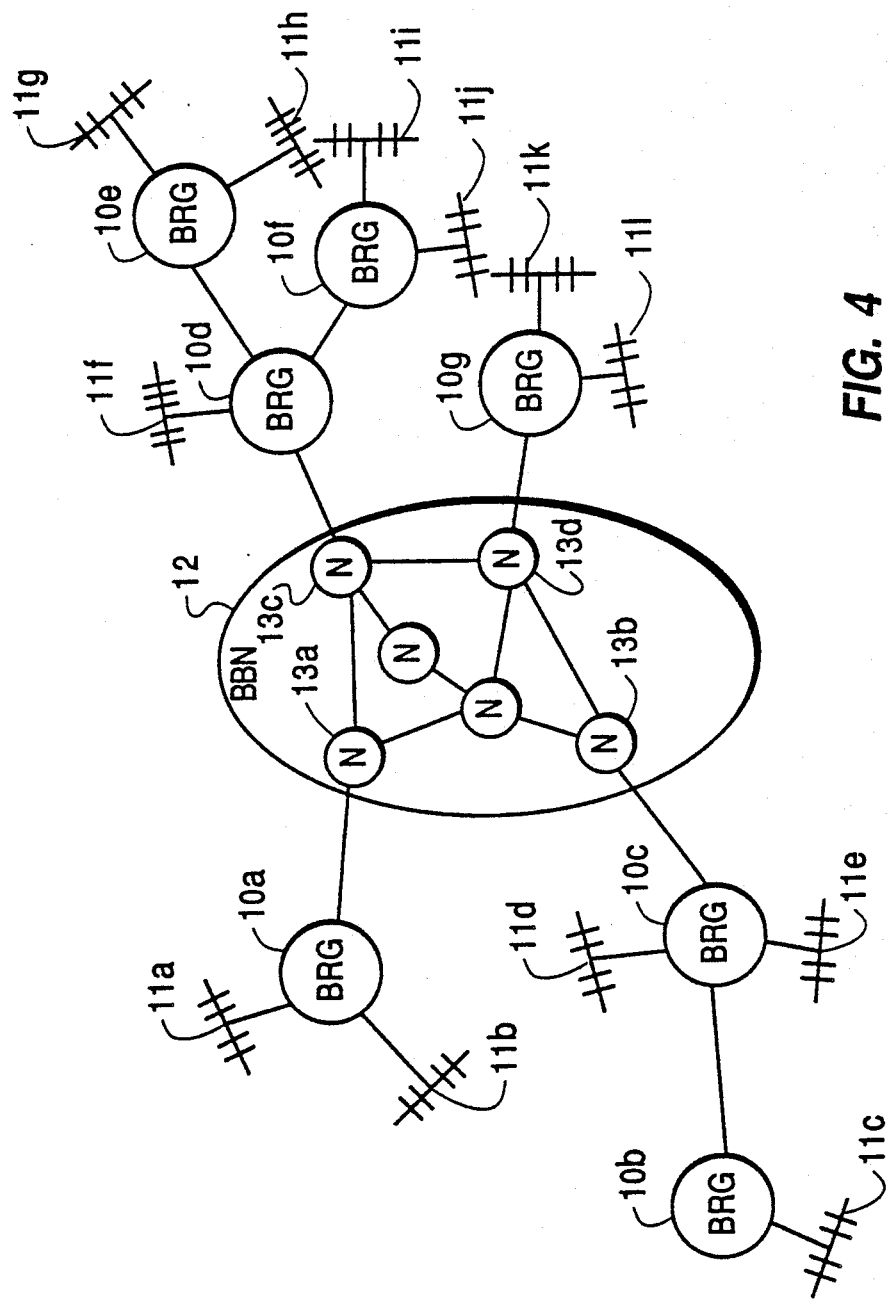
FIG. 4 is a schematic diagram of a network comprising a plurality of LANs, a plurality of bridge apparatuses and a backbone network.

In FIG. 4, LANs 11a–11l are respectively connected to bridge apparatuses (BRG) 10a to 10g. Respective bridge apparatuses 10a, 10c, 10d and 10g are connected to nodes 13a, 13b, 13c and 13d, which form BBN 12. Bridge apparatuses 10b and 10c are connected to each other and bridge apparatus 10d is connected to bridge apparatuses 10e and 10f.

Bridge apparatuses 10a, 10c, 10d and 10g are equipped with a register to function as node address determining means 4. Furthermore, addresses of nodes 13a, 13b, 13c and 13d, through which BBN 12 is connected, are set in the register of respective bridge apparatuses in advance.

Figure 5A:
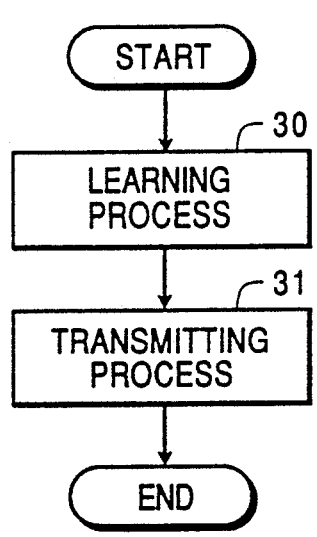
FIGS. 5A, 5B and 5C are flowcharts describing the operation of the present invention.

When respective bridge apparatuses 10a to 10g receive a data frame and carry out a learning process (step 30), they then carry out the transmission process (step 31) as shown in FIG. 5A.

Figure 5B:
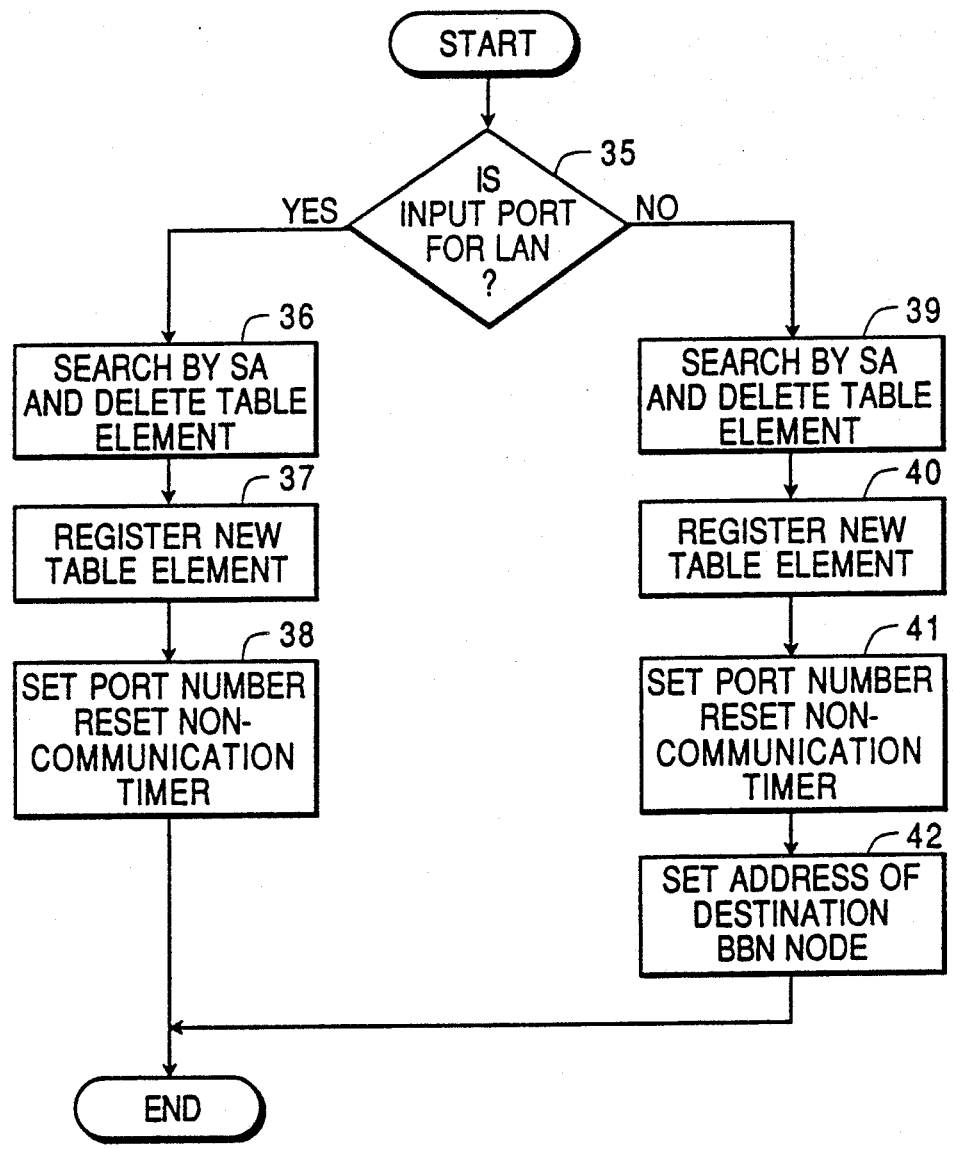

As shown in FIG. 5B, the learning process judges whether the port receiving the data frame is connected to LAN or to a node of BBN (step 35). If the ports for receiving the data frame are for LAN, MAC address table or learning table 3 is searched using the source address SA of the data frame. The table element for this MAC address is deleted for renewal if it exists (step 36). Thereafter, a new table element of the source address SA is connected to the head of the chain and is then registered (step 37). The port number for receiving the data frame is set to port number 3e (shown in FIG. 3) for the new table element and non-communication timer 3g of the new table element is subjected to a 0 reset (step 38).

When the data frame is entered from a port for BBN, MAC address learning table 3 is searched using the source address SA of the data frame and the table element of the MAC address is deleted for renewal if it exists (step 39). Thereafter, the new table element of the MAC address which is the source address SA is connected to the head of the chain and registered (step 40). The (BBN) port number for receiving the data frame is set at 3e of the new table element and the non-communication timer 3g of the new table element is subjected to a 0 reset (step 41). The steps up to this point are the same as steps 36 to 38. BBN source node address SNA of the data frame is set at the destination BBN node address 3f for the new table element (step 42).

Figure 5C:
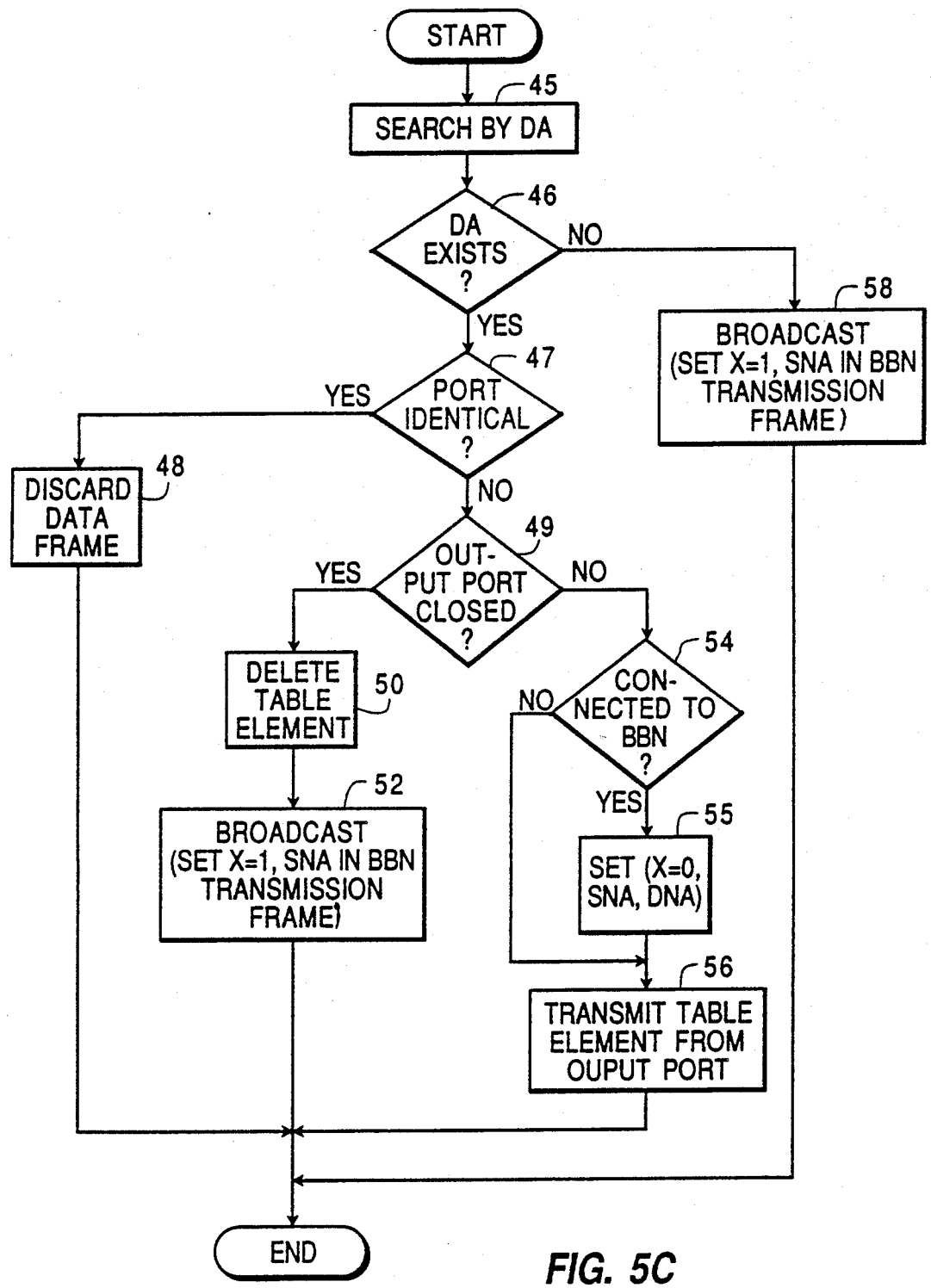

As shown in FIG. 5C, the MAC address learning table 3 is searched using the destination address DA of the received data frame (step 45) to judge whether or not the destination address DA is already registered in the MAC address table. If the search is completed (step 46) successfully, a process judges whether or not the port for receiving the data frame in the apparatus is identical to the port number of the searched table element, namely, the output port (step 47). If they are identical, the data frame is communicated within the same LAN and is disposed to avoid a double communication (step 48). If the ports are not identical, the process judges whether or not the output port obtained from the learning table is closed (step 49). If the output port is closed, the searched table element is deleted from the MAC address learning table 3 (step 50). The data frame is then broadcast, namely, it is transmitted from all ports other than the port receiving the data frame (step 52). Upon transmission, "1" is set in the compulsory broadcast control bit X of the data frame transmitted from the port connected to the BBN. Node address NA, which is set in advance in the register, is set in the source node address SNA, for transmitting the BBN data frame from a port connected to the BBN. The LAN data frame is simultaneously transmitted from a port connected to the LAN. These steps are the same as the following steps 56 and 58. If the output port obtained from the table element is not closed, "0" is set in a compulsory broadcast control bit X of the data frame only when the output port is connected to the BBN. The node address, previously set in the register, is then set in the source node address SNA, and the BBN node address, obtained by searching the table element, is set in the destination node address DNA (steps 54 and 55). Thus, the data frame is transmitted through an output port obtained form the table element (step 56). When the search of the DA in MAC address learning table 3 is not successful, the MAC address learning table 3 of the data frame is broadcast (step 58). In a similar manner to step 52, upon transmission, 37 1" is set in a compulsory broadcast control bit X of the data frame transmitted to the port connected to BBN. Node address NA, previously set in the internally equipped register, is set in source node address SNA and the BBN data frame is transmitted. On the other hand, the LAN data frame comprising destination address DA, source address SA and data DATA is transmitted from the port connected to the LAN.

Figure 6:
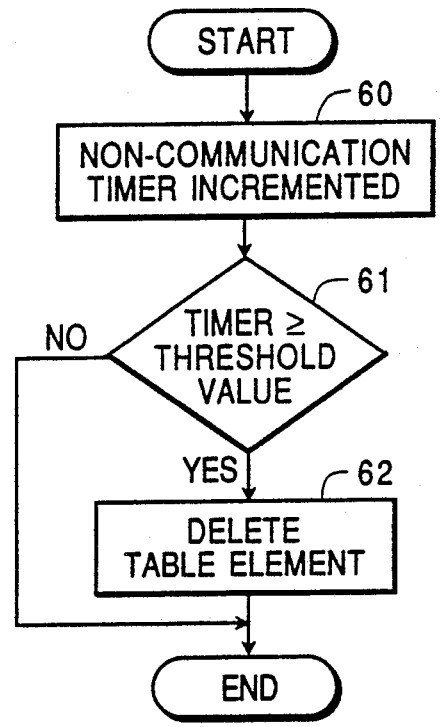
FIG. 6 is another flowchart describing the operation of the present invention.

Bridge apparatuses 10a, 10c, 10d and 10g perform a table renewing process at a predetermined time interval, as shown in FIG. 6. At step 60, the value of non-communication timer 3g of respective table elements in MAC address learning table 3 is incremented by a predetermined value. The value of non-communication timer 3g for respective table elements is compared with a predetermined threshold value (step 61). When the value of non-communication timer 3g exceeds the threshold value, the table element is deleted from MAC address learning table 3 (step 62). If a table element is registered in MAC address learning table 3 for a long time period the number of tables increases. Thus step 62 prevents this increase in the number of table elements stored in the learning table and thus prevents a decrease in the efficiency of the table search. If the threshold value is selected to be small, the number of broadcasts increases, thereby decreasing the use efficiency of the LAN. The threshold value can be determined discretionally in accordance with the scale of the system.

Figure 7:
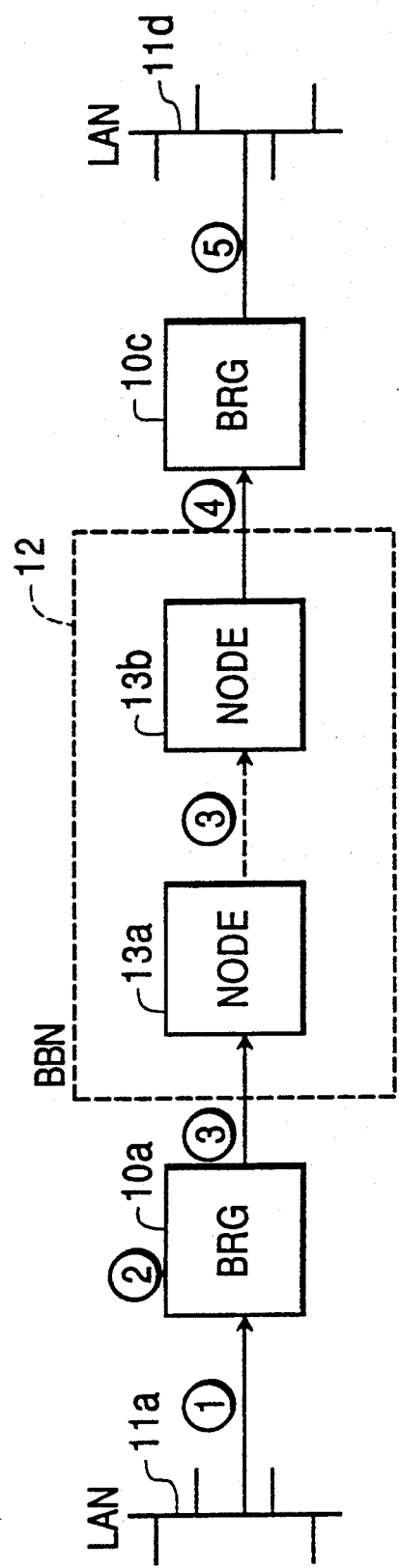
FIG. 7 is a block diagram of a communication system comprising LANs, bridge apparatuses and a backbone network.

As shown in FIG. 7, the data frame transmitted by LAN 11a is inputted to bridge apparatus (BRG) 10a and transmitted sequentially through nodes 13a and 13b of BBN 12 and bridge apparatus 10c to be received by LAN 11d.

The relay transmission of the frame can be understood in more detail by referring to FIG. 8. FIG. 8A explains the events which occur when a frame with a non-registered DA is transferred to learning table 3 of BRG 10a. e,cir/1/ to ⑤ in FIG. 8A correspond to ① to ⑤ in FIG. 7.

In FIG. 8A, ① is a frame received by BRG 10a through a LAN. The received frame comprises DA, SA and DATA.

② is a frame processed in BRG 10a. The compulsory broadcast designation bit "1" is added to this learning frame. The DA of the received frame has not been registered in table 3 of BRG 10a, so a compulsory broadcast designating bit "1" is added.

③,④ in FIG. 8A is the data frame to be transmitted from BRG 10a to the node 13b of the BBN via node 13a of the BBN, and then to be transmitted to BRG 10c by the node 13b of the BBN. The data frame ③,④ includes the source BBN node address, for example, "SNA", in addition to the frame shown in ②. BRG 10c receives the added source BBN node address and registers it in learning table 3 in a manner corresponding to the SA, thereby storing source BBN node address SNA in BRG 10c.

⑤ is a frame to be transmitted to the LAN by BRG 10c.

As described above, BRG 10a adds a compulsory broadcast designation bit to the data frame. The BRG 10a further adds the source BBN node address to the data frame to be transmitted to BRG 10c. BRG 10c registers the SA and source BBN node address of the frame in learning table 3, thereby carrying out a learning operation and frame transmission.

Figure 8B:
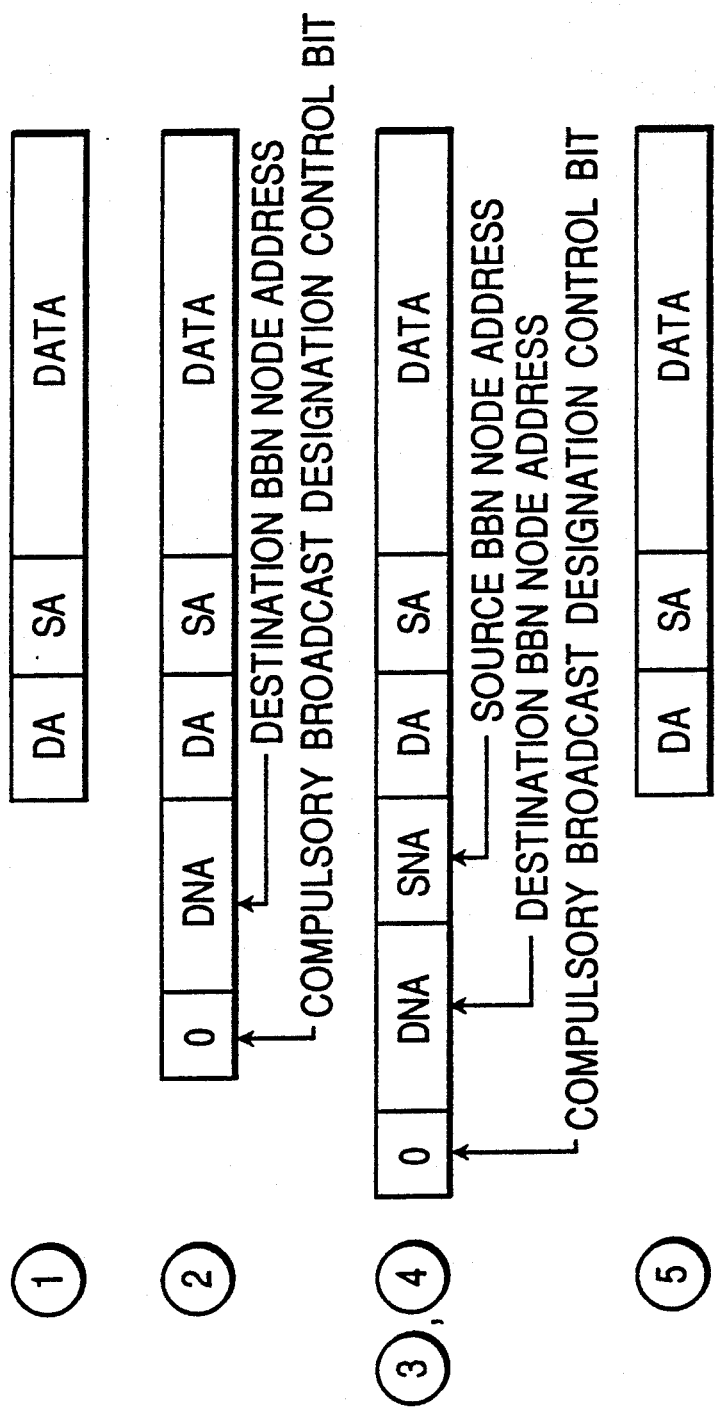
FIG. 8B is a frame format of the data frame to which the DA already registered in the learning table in the bridge apparatus is transferred.

The case in which a frame with a registered DA is transmitted to learning table 3 in BRG 10a can be understood by referring to FIG. 8B. ① to ⑤ in FIG. 8B correspond to ① ⑤ in FIG. 7.

In FIG. 8B, ① designates a frame received through a LAN by BRG 10a.

② is a frame to be transmitted to BBN by BRG 10a. As the DA in the received frame is registered in learning table 3 in BRG 10a, the compulsory broadcast designation bit "0" and the destination BBN node address "DNA" are added to the frame.

③ and ④ indicate the frame to be transmitted to BRG 10c by a node of BBN. This frame has the source BBN node address, for example, "SNA" in addition to the frame shown in ②. BRG 10c receives the destination BBN node address, and the source BBN address to which the above bits are added, and registers them in self learning table 3 in a manner corresponding to the SA. Thus, the source BBN node address in BBN is registered in BRG 10c.

⑤ indicates a frame to be transmitted to the LAN by BRG 10c.

As described above, BRG 10a simultaneously adds compulsory notification designation bit "0" and destination BBN node address to the frame. The BBN also adds the source BBN node address to the frame. Then, the frame is transmitted to BRG 10c. The SA and source BBN node address in the frame are registered in table 3 in BRG 10c, thereby performing a learning operation and a frame transmission.

The learning operation in the network structure according to the present invention can be understood in more detail by referring to learning tables 3 shown in FIGS. 9A and 9B and an illustrative view shown in FIG. 3. The learning table (A) shown in FIG. 9A is included in bridge apparatus (BRG-A) 1A and learning table (B) shown in FIG. 9B is included in bridge apparatus (BRG-B) 1B. If nothing is registered in the learning tables, referring to FIG. 3, S1 to S4 represent the following steps.

S1 shows the route terminal #→LAN 2A→BRG-A
S2 designates the route BRG-A→BBN→BRG-B→LAN 2B→terminal #2
S3 shows the route terminal #2→LAN 2B→BRG-B
S4 shows the route BRG-B→BBN→BRG-A→LAN →terminal #1

The frame is transmitted in accordance with the route shown by the above S1 to S4 in the network structure. S1 and S2 in FIGS. 9A and 9B show the case where the frame is transmitted in a sequence terminal #1→LAN 2A→BRG-A→BBN→BRG-B→LAN 2B→terminal #2

In S1 in FIG. 9A, BRG-A registers MAC address #1 and port number m from the frame received from terminal #1 through LAN 2A. The timer value is reset to "0".

In FIG. 9A, at S2, BRG-A normally broadcasts the frame to all the nodes, but in this case broadcasts the frame only to BBN.

In FIG. 9B, at S1, BRG-B does not perform any function.

In FIG. 9B, at S2, BRG-B registers MAC address #1, received port number "q", and source BBN node address "SNA" from the frame received from BBN. BRG-B also resets the timer value to "0".

In accordance with the above frame transfer, the data is registered in learning table 3 at S1 in FIG. 9A and at S2 in FIG. 9B.

Similarly S3 and S4 in FIGS. 9A and 9B show the case where the frame is transferred in the sequence terminal #2→LAN 2B→BRG-B→BBN→BRG-A→LAN 2A→terminal #1.

In FIG. 9B, at S3, BRG-B registers MAC address #2 and received port number "n" from the frame received from terminal #2 through LAN 2B and the timer value is reset to "0".

In FIG. 9B, at S4, BRG-B normally broadcasts the frame but in this case, the frame is transmitted only to BBN.

In FIG. 9A, at S3, BRG-A does not perform any function.

In FIG. 9A, at S4, BRG-A registers MAC address #2, received port number "p", and source BBN node address "SNB" from a frame received from the BBN. BRG-A also resets the timer value to "0".

In accordance with the above transmission, the data is registered in learning table 3, shown at S3 in FIG. 9B, and at S4 in FIG. 9A.

As described above, the terminal address, the port number and the node address obtained from the arriving data frame are registered in the learning table in bridge apparatuses 1A and 1B. This learning table is then searched, thereby providing the port number through which the data frame is transmitted. The source node address SNA of the data frame for BBN is set by an internal table register in respective bridge apparatuses 1A and 1B which is connected to nodes NA and NB of BBN 5. Thus, the conventional BBN 5 does not have to be modified.

Registration and searching of the SA can be conducted in learning table 3 at high speed using a so-called hash function. The MAC address is expressed by a key K whose value is divided by a constant, and whose remainder is used as the address. This provides a function H, namely, a predetermined position "a" of the data value in the table is determined by a function of "a"=H (K). With any kind of function (H), a plurality of different keys K1, K2 ... are converted to the same address. A so-called bucket is provided in which a plurality of data is stored in one address. Thus, collision is prevented. Using the above hash method, the time for searching the table can be determined independently of the size of the table.

Figure 10:
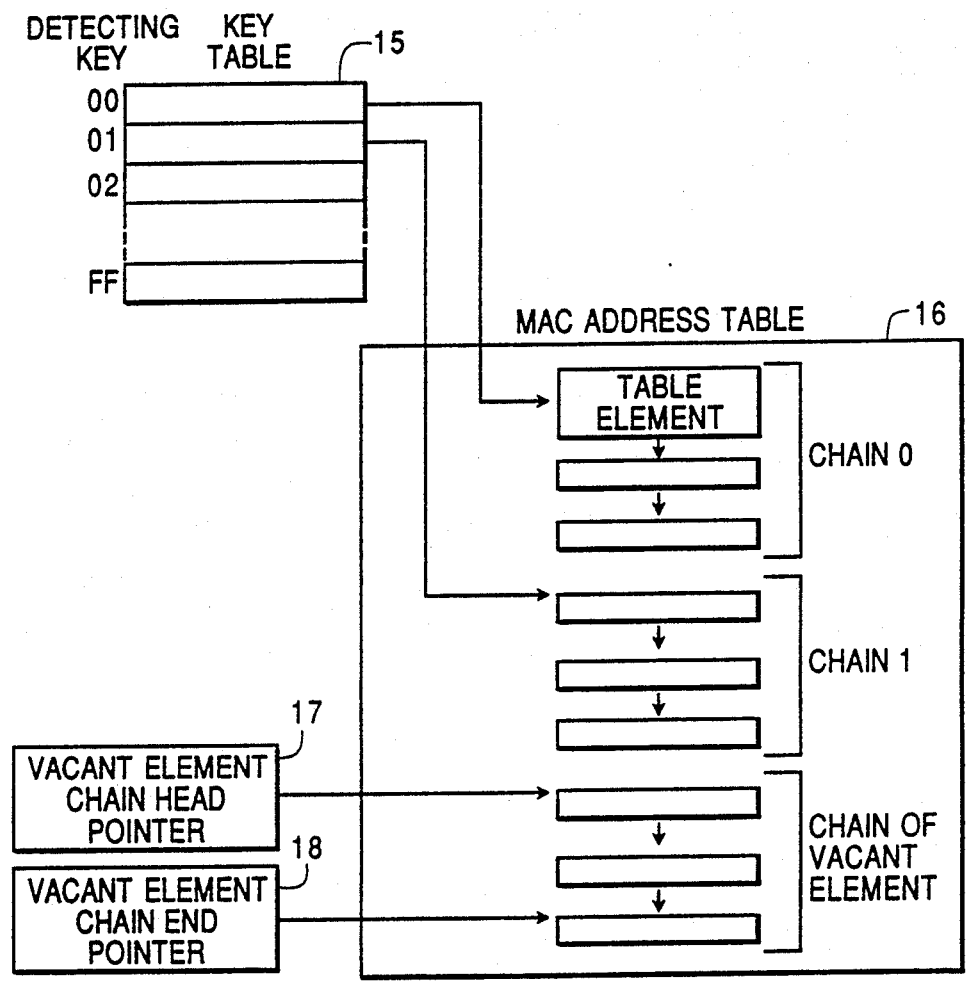
FIG. 10 is a block diagram of the learning table using a hash function.

The learning table is provided in bridge apparatuses 1A and 1B as shown in FIGS. 10A and 10B. As shown in FIG. 10A, the learning table comprises key table 15 and MAC address table. Key table 15 stores the address of a head table element of a search chain for every one-byte search key. A table element in MAC address table 16 constitutes a search chain corresponding to the above search key. The empty element in MAC address table 16 also constitutes a chain. The head and last address of this chain are stored in an empty element chain head pointer 17 and empty elements chain end pointer 18.

The table element is provided as is shown in FIG. 3.

A search of the MAC address table is conducted in the following sequence, (1) A search key K is obtained from bits B1 to B6 of the 6-byte MAC address to be searched, and the coefficients C1 to C6 are predetermined in accordance with a following equation.

$$K = C_1 \cdot B_1 + C_2 \cdot B_2 + C_3 \cdot B_3 + C_4 \cdot B_4 + C_5 \cdot B_5 + C_6 \cdot B_6$$

This function is a simple example of a hash function.

(2) A head address of search chain is obtained from key table 15 by using the search key K as an address.

(3) The chain follows and searches a table element using the above head address to look for the MAC address of an object. When data chain existence/non-existence flag 3d is 0, the table element is the end of a chain. If the valid/invalid flag in the table element is "1", the table element is valid. If the valid/invalid flag is 0, the table element is invalid.

Figure 11A:
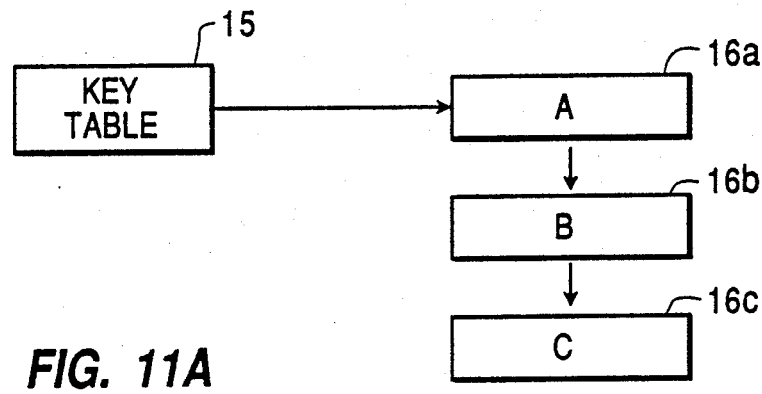
FIG. 11A to 11C are block diagrams of a registration and deletion of the table element.
Figure 11B:
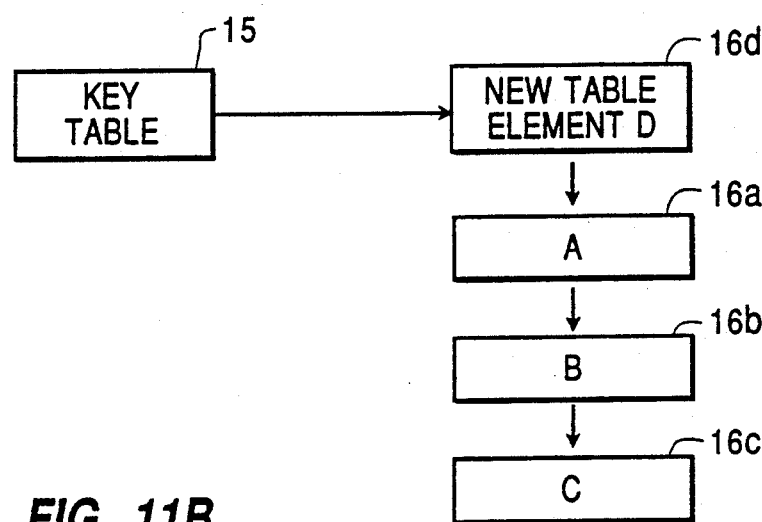

As shown in FIG. 11A, table elements 16a, 16b and 16c constitute a chain. The registration of a new table element 16d is conducted, as shown in FIG. 11B, by changing the content of the key table of a search key corresponding to the MAC address of the new table element 16d to contain the address of the new table element 16d. The address of table element 16a is set in the next table element address of new table element 16d, thereby connecting new table element 16d to the head of the chain.

Figure 11C:
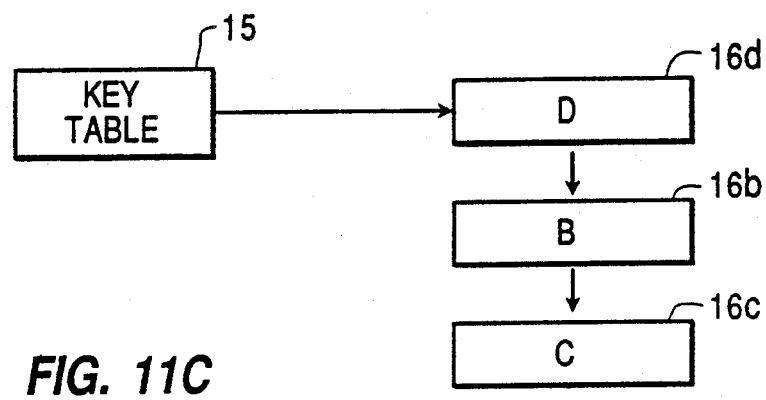

As shown in FIG. 11C, the deletion of table element 16a is conducted by deleting table element 16a and setting the address of table element 16b in the next table element of table element 16d. This changes the connection of the chain.

Figure 12:
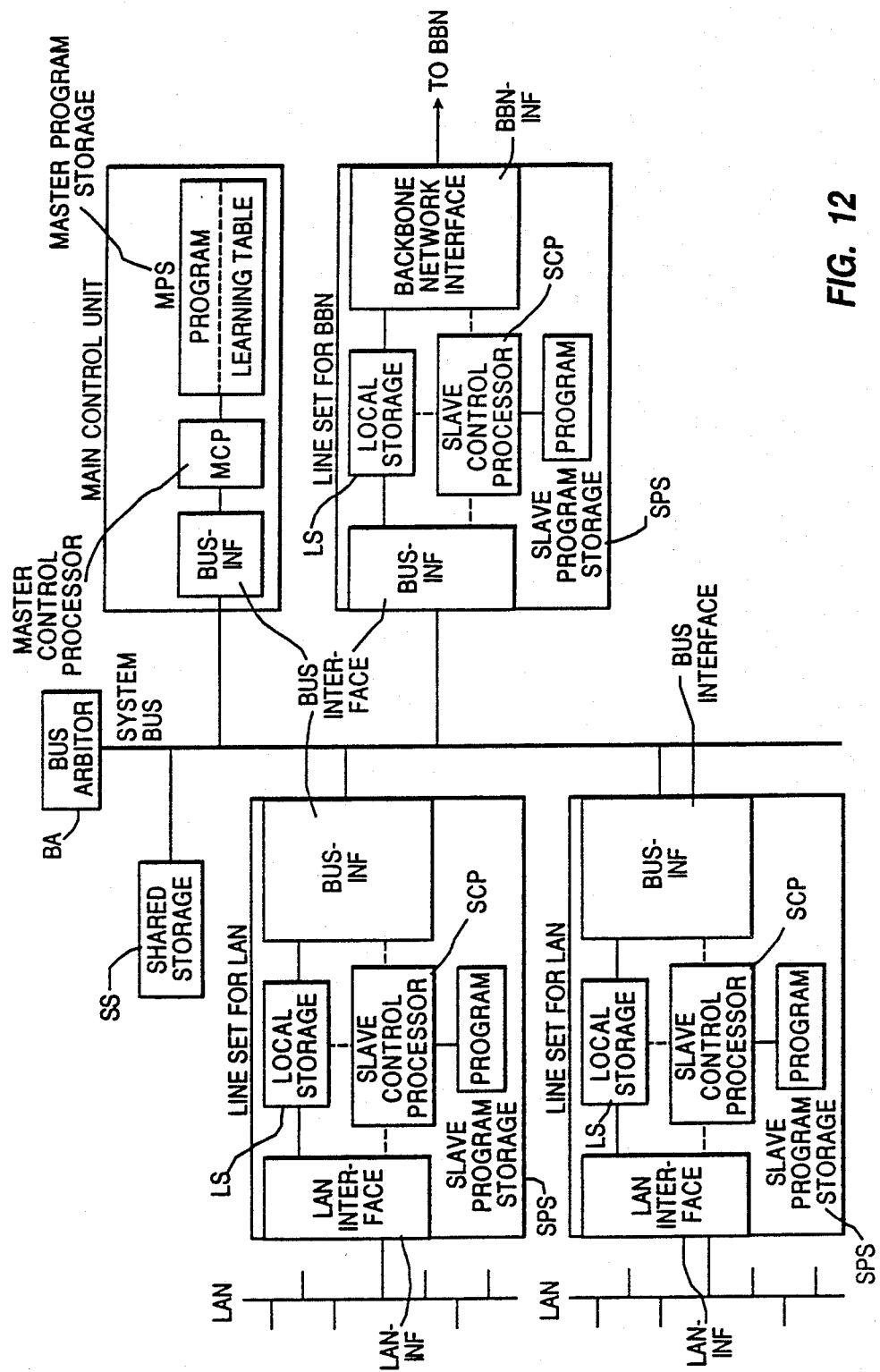
FIG. 12 is a block diagram showing the operation of the bridge apparatus.

FIG. 12 is a block diagram which shows the system structure of a bridge apparatus according to the present invention. BA is a bus arbitor for arbitrating the right to use the bus; SS a shared memory; LS a local buffer memory; MCP a main control processor; SCP a slave control processor; MPS a memory for storing a MCP program and a learning table; SPS a memory for storing a SCP program; BUS-INF a bus interface; LAN-INF an LAN interface circuit; and BBN-INF a BBN interface circuit. When a frame is received from LAN, LAN-INF receives a frame transmitted along LAN and stores into local buffer memory LS. Simultaneously, LAN-INF performs an error-bit check. LAN-INF notifies slave control processor SCP of the receipt of the frame, which in turn controls the bus interface and transmits a frame stored in local buffer memory LS to shared memory SS. Slave control processor SCP also notifies main control processor MCP in the main control unit of the transfer of the receiving frame to the shared storage SS. Further, slave control processor SCP notifies main control processor MCP in which address of shared storage SS the frame is written. Upon receipt of notification from slave control processor SCP, main control processor MCP recognizes that the frame has been received by the LAN. The above is the flow of the process conducted by the bridge apparatus when the frame is received from the LAN by the bridge apparatus.

Next, when the frame from the BBN is received, the same operation as in the line set in the LAN is conducted in the line set for the BBN. The BBN-interface BBN-INF receives a frame transmitted from BBN and stores it in local storage LS. The BBN interface BBN-INF then checks whether the frame contains an error. Next, it notifies slave control processor SCP that the frame is received. Slave control processor SCP controls bus interface BUS-INF and transfers the frame in local storage LS to shared storage SS. Slave control processor SCP notifies master control processor MCP that the received frame is transferred to shared storage SS and in which address of shared storage SS it is written. Thus, master control processor MCP recognizes that the frame is received from BBN and completes the receiving process.

Next, the process of the bridge apparatus is explained. When master control processor MCP receives a frame-receipt notification from the slave control processor, it reads the source address information of the received frame in shared storage SS and registers it in a learning table of master program storage MPS. When master control processor MCP receives a notification of a frame receipt from the BBN line set, it registers a node address of BBN in a learning table. It then reads the destination address of the received frame of shared memory SS and searches the learning table using this destination address, thereby determining a line set to which information should be sent or whether a broadcast transmission is to be made. Next, it performs a format conversion of the frame from the BBN interface to a frame for the LAN interface. Then, main control processor MCP notifies slave control processor SCP in line set of a LAN or a plurality of line sets to which the frame should be transmitted that the frame in shared storage SS is to be transmitted and in which address of shared storage SS the frame is stored.

Next a frame transmission is conducted. When the slave control processor SCP in respective line sets receives a frame transmission instruction from master control processor MCP, it transmits the frame from shared storage SS to local storage LS. Thus, slave control processor SCP controls a LAN interface LAN-INF or BBN interface BBN-INF to transmit the frame in local storage LS to LAN or BBN.

Figure 13A:
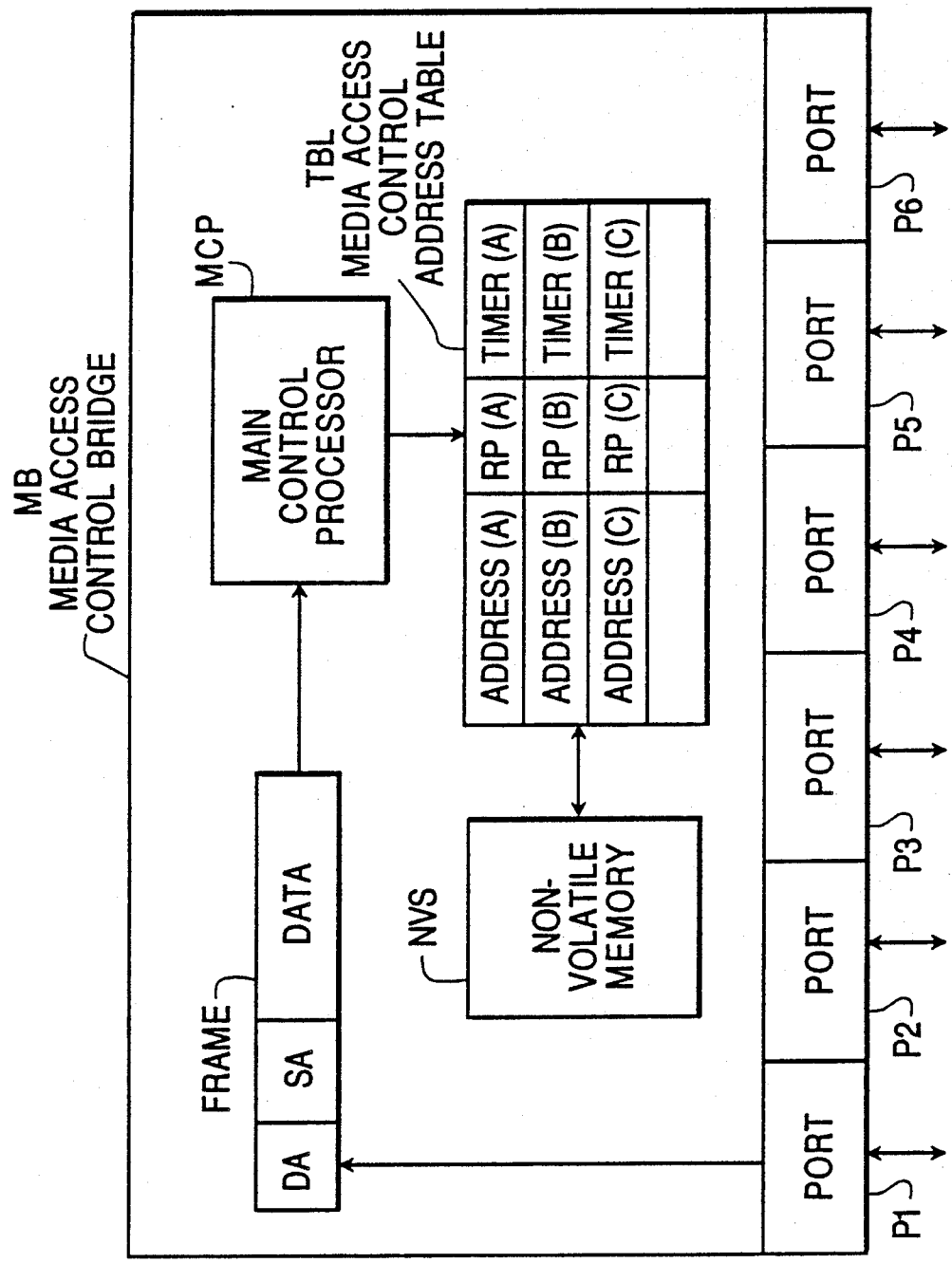
FIG. 13A is a block diagram showing the principle of another embodiment of the present invention.
Figure 13B:
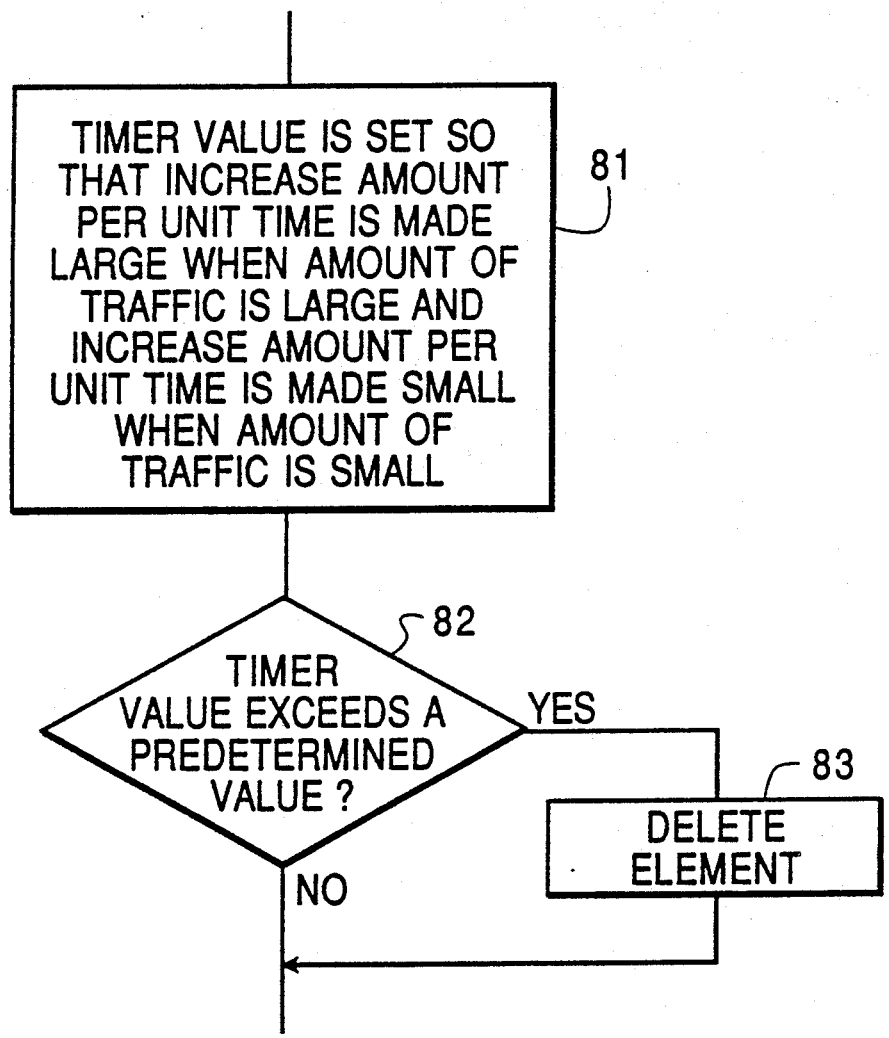
FIG. 13B is a flowchart of the embodiment shown in FIG. 13A.

FIG. 13A is a block diagram of principle parts of another embodiment of the present invention. FIG. 13A shows a functional block diagram of the present invention and FIG. 13B shows a renewal process of a non-communication type timer utilized in this embodiment. MB represents a MAC bridge address apparatus, MCP a main control unit, TBL a MAC address table, NVS a non-volatile memory, and P1 to P6 respective ports.

When a frame having DA=I and SA=J is inputted from the port P1, P1 and J1 are written in the MAC address table TBL, for example, in the fourth record. P1 is written in the port column and 0 is written in the timer column of a vacant element of MAC address table TBL, on the condition that the identified element does not exist in the MAC address table. Next, a frame having DA=J and SA=K is inputted from port P2, K is written (for example, in the fifth record) in the address column, P2 in the port column, and 0 in a timer column in a vacant element in a MAC address table, on the condition that the corresponding element does not exist in the MAC address table. Address J is identified as corresponding to P1, and the frame having DA=J and SA=K inputted from port P2, is outputted from port P1. When an element in which an address column value of J does not exist in the MAC address table, a frame having DA=J and SA=K inputted from port P2, is outputted from all the ports except port P2.

The value of the timer of the timer column in each non-vacant element increases with time. Where a frame having the same SA as an element address is inputted from a port designated by the port name of the element, the value of the timer column of the element is made to be 0. Note that the above control can also be conducted in the conventional technology. As shown in FIG. 13B, the amount of increase per unit time is made to be large when the amount of traffic is large, and is made to be small when the amount of traffic is small (step 81). When the value in the timer column of the element exceeds a predetermined value (step 82), the element is deleted from the MAC address table (step 83). Such control can be conducted by the main control unit (MCU).

In this embodiment, the MAC address table stored in a high speed memory (RAM) is saved in a non-volatile memory NVS upon a shut-down of the power source. The MAC address table stored in the non-volatile memory NVS is restored in a predetermined area when the power is turned on. Such control may also be conducted by the main control unit.

Figure 14:
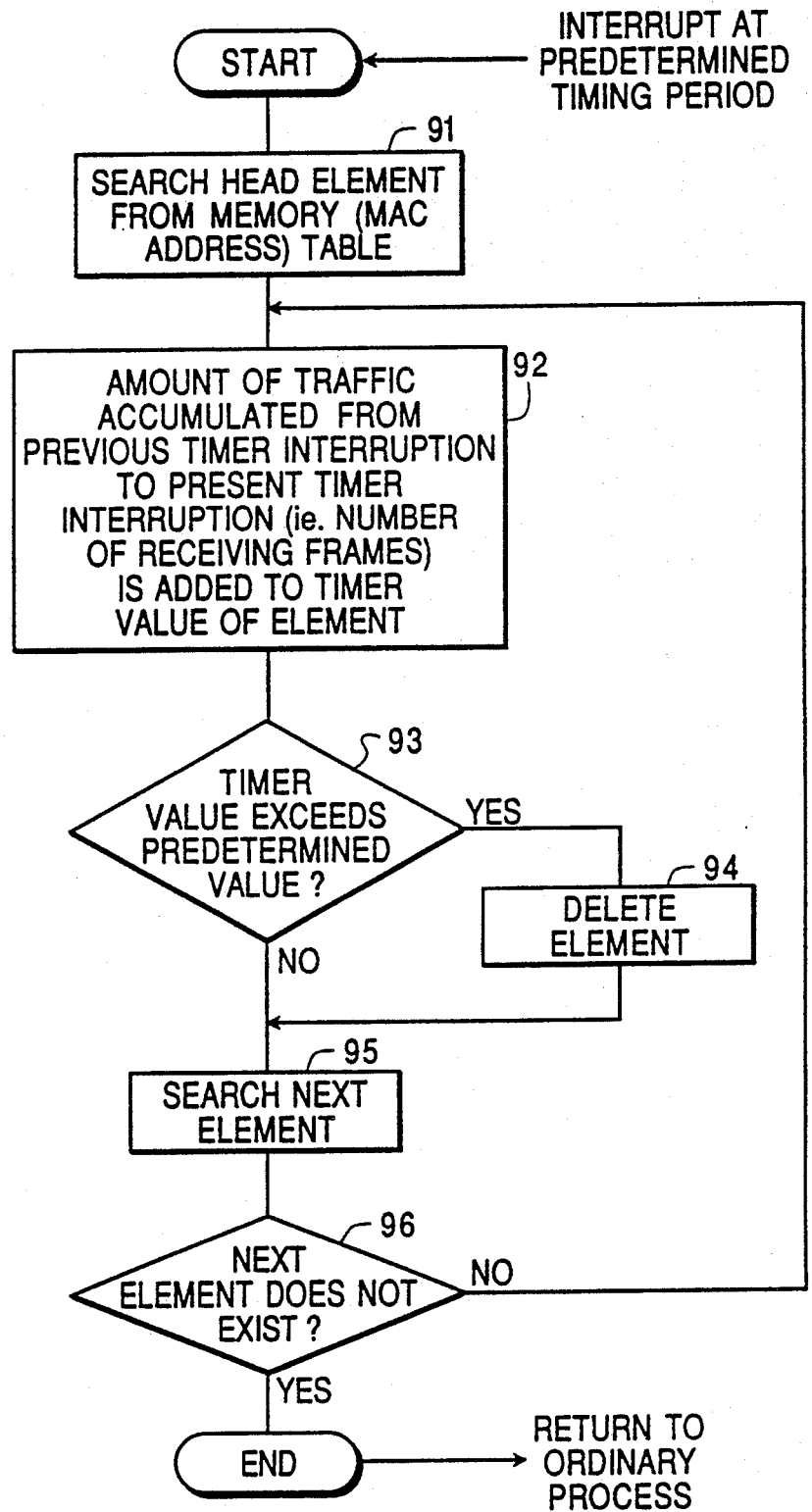
FIG. 14 is a flowchart showing the operation of a renewal of a value of a timer used to count a non-communication period.

FIG. 14 shows an example of a renewal processing of the non-communication timer according to the present invention. An interruption occurs with predetermined timing and at each interruption, the following process is performed.

Step 91. The head element from a memory (MAC address table) is searched.

Step 92. The amount of traffic (i.e. the total number of received frames) from the previous timer interruption to the present one is summed.

Step 93. It is determined whether the timer value is the predetermined value. When the answer is YES, the process goes to step S4 and if it is NO, the process proceeds to step 95.

Step 94. The element is deleted and the process proceeds to step 95.

Step 95. The next element is searched.

Step 96. The existence or non-existence of the next element is determined. If it does not exist, the process returns to step 92 and if it does, the process is ended and the ordinary process resumes.

In FIG. 14, the total number of frames received from the previous timer interruption to the present timer interruption is used to represent the amount of traffic. The value representing the degree of crowding on the transmission path may also be used to designate the amount of traffic. The sum of the transfer bytes and the number of element registrations may further be used.

Figure 15B:
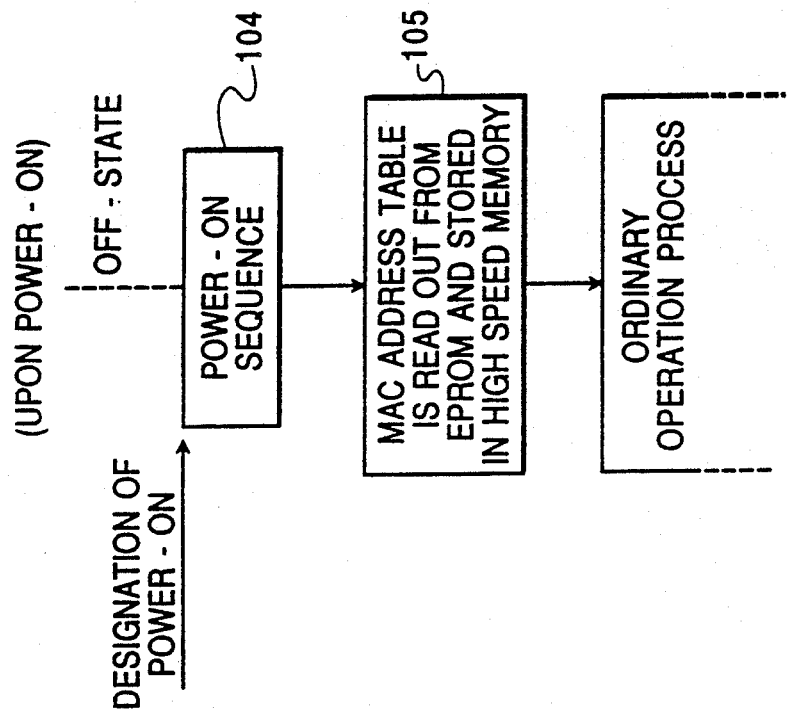
FIGS. 15A and 15B are flowcharts for showing the operation of a saving or restoration of MAC address table.
Figure 15A:
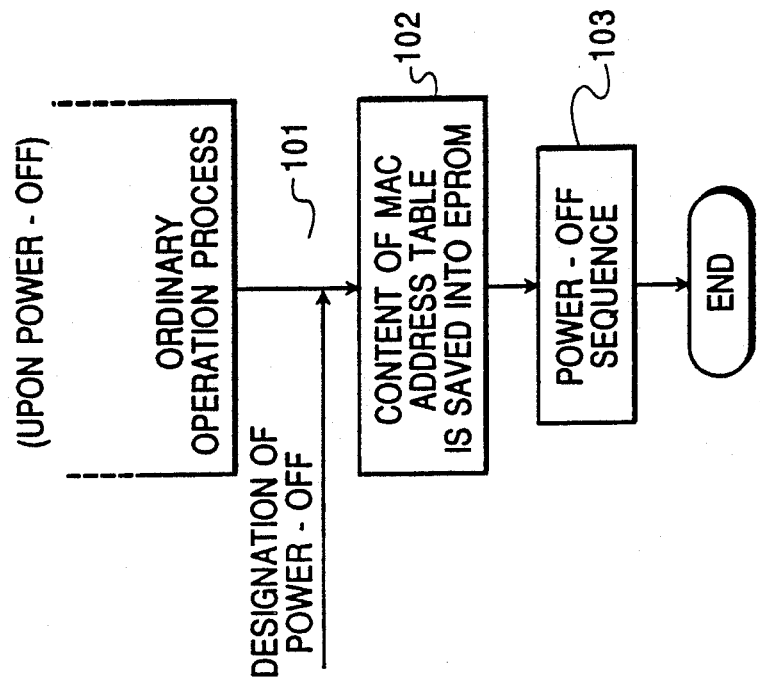

FIGS. 15A and 15B show an example of a saving and restoring process of the MAC address table of the present embodiment.

When the power-off designation is issued (step 10), the MAC address table stored in a high speed memory is saved in a non-volatile memory such as EPROM (step 102) and thereafter another power-off sequence can be conducted (step 103).

When a power-on is designated (step 104), the power-entering sequence is first carried out. Thereafter, the MAC address table is read out from the non-volatile memory, and the MAC address table is thereby stored in a predetermined area of a high speed memory (step 105).

In the prior art, the learning content of the MAC address table is deleted in an undesired manner when the communication is interrupted. The present embodiment avoids this situation. In the prior art technology, when the power source of the MAC bridge apparatus is shut off the total content of the MAC address table is deleted. By contrast, in the present invention, the learning content of the MAC address table is maintained regardless of the on/off operation of the power source. Furthermore, an increase in the traffic caused by useless transmission of the frames upon power switch-on is also avoided.

As described above, the bridge communication system of the present invention does not require a process for setting the table and changing the content of the table but utilizes the learning function of a bridge apparatus. Thus, it does not perform any error determination and does not need to change the conventional BBN network. Thus, it utilizes the system without increasing the load in the BBN, thereby greatly increasing the practicality of the system.

In the present invention, the bridge apparatuses 1A and 1B having learning table 3 and BBN 5 do not perform the learning function. Thus, a large-scale bridge network with a learning function can be easily constructed without increasing the load of BBN 5. Further, as the node address of network BBN 5 is added to the frame upon transmission and is registered in learning table 3 of the bridge apparatus connected to network BBN 5, it is unnecessary to register the node address in the BBN 5 in advance.

What is claimed is:

1. A bridge communication system for connecting a plurality of bridge apparatuses, each connected to a local area network, through a backbone network and for performing communication, between terminals connected to the local area network connected to each bridge apparatus, through said backbone network, each bridge apparatus comprising:

a backbone-network node address setting means for previously setting an address of a local node of said backbone network connected to said bridge apparatus;

a learning table for storing at least a port number of said bridge apparatus and an address of a corresponding node of said backbone network, corresponding to respective terminals;

means for sequentially registering in said learning table a source address designating a source terminal of a data frame received by said bridge apparatus via a port from one of said local area network and said backbone network, a port number of the port receiving the data frame for said bridge apparatus, and a source backbone-network node address when the data frame is transmitted from said backbone network, said source address, said port number and said source backbone-network node address representing, respectively, an address of a terminal, a port number and an address of a node; and means for adding at least the address of the local node stored by said backbone node address setting means and the address of any node, obtained by searching said learning table, to said data frame to be transmitted to said backbone network as the source node address and the destination node address, respectively.

2. A bridge communication system according to claim 1, wherein said adding means comprises searching means for searching said learning table using a destination address, designating a destination terminal, in said data frame to be transmitted from said bridge apparatus, and wherein each bridge apparatus in said bridge communication system further comprises:

means for transmitting said data frame through a port designated by the port number obtained when the searching is completed successfully; and means for broadcasting said data frame from all ports of said bridge other than the port through which the data frame is received when the searching is not successful.

3. A bridge communication system according to claim 1, wherein said learning table includes a timer value corresponding to the respective terminals, and wherein said sequential registering means, upon receipt of a data frame containing a previously stored source address, re-registers the port number and the backbone-network node address, included in the data frame, in the learning table, and resets the timer value.

4. A ridge communication system according to claim 1, wherein a search is conducted using a hash function to determine whether the destination address is registered in the learning table.

5. A bridge communication system according to claim 1, further comprising means for determining whether the port number obtained by searching said learning table is identical to the port number of the port receiving the data frame.

6. A bridge communication system according to claim 1, wherein when the receiving port is not identical to the transmission port, means for determining whether the transmission port is usable, means for discarding the destination address, from the learning table of the transmission port which is not usable, and means for outputting the data frame to the transmission port shown in the learning table if the transmission port is usable are provided.

7. A bridge communication system according to claim 1, wherein means is provided for performing a count-up or count-down of a timer value of an element registered in the learning table, and for deleting the element from the learning table when the timer value of the element exceeds a predetermined value.

8. A bridge communication system according to claim 1, wherein means is provided for making a compulsory broadcast designation bit effective upon transmission of the data frame to the respective bridges.

9. A bridge communication system according to claim 1, wherein means is provided for including a self address in a table element corresponding to the MAC address in the learning table, thereby connecting the table in a chained manner.

10. A bridge communication system according to claim 1, wherein means is provided for representing whether or not a chain exists.

11. A bridge communication system according to claim 1, wherein when the data frame is received from LAN or BBN, means is provided for storing the data frame in local storage, notifying a slave control processor of the receipt of the data frame transferring the data frame from local storage to shared storage under the control of said slave control processor, notifying a master control processor in a main control unit that the data frame has been transferred to shared storage, notifying the master control processor of the address in which the data frame is written, and recognizing receipt of the data frame by the master control processor upon receipt of a notification from the slave control processor.

12. A bridge communication system, comprising:

a main control unit, a memory having an address table with an address column, a port name column and a timer column, means for writing elements in said address table, each element having a source address of a received frame, a name of a port, used to receive the received frame, and a timer value, under control of said main control unit when the received frame is received, and means for increasing the timer value of each element in said address table to increase the timer value per unit time with a larger increment when traffic is higher and a smaller increment when the traffic is lower, and for deleting each element having a larger timer value than a predetermined value, from said address table.

13. A bridge communication system, comprising:

a main control unit;

a volatile memory having an address table with an address column, a port name column and a timer value column;

means for writing elements in said address table, each element having a source address of a received frame, a name of a port, used to receive the received frame, and a timer value, under control of said main control unit when the received frame is received;

a non-volatile memory; and means for saving in said non-volatile memory said address table, provided in said volatile memory, when power is turned off and for restoring said address table saved in said non-volatile memory, in a predetermined area of said volatile memory when the power is turned on.

* * * * *